United States Patent
Marchese et al.

(10) Patent No.: US 11,599,267 B2
(45) Date of Patent: Mar. 7, 2023

(54) PERFORMANCE THRESHOLD

(71) Applicant: Hewlett-Packard Development Company, L.P., Spring, TX (US)

(72) Inventors: Tadeu Marchese, Porto Alegre (BR); Raphael Gay, Fort Collins, CO (US); Taciano Perez, Porto Alegre (BR)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 0 days.

(21) Appl. No.: 17/388,422

(22) Filed: Jul. 29, 2021

(65) Prior Publication Data

US 2021/0357118 A1 Nov. 18, 2021

Related U.S. Application Data

(62) Division of application No. 16/482,980, filed as application No. PCT/US2017/015987 on Feb. 1, 2017, now Pat. No. 11,093,136.

(51) Int. Cl.
G06F 3/06 (2006.01)

(52) U.S. Cl.
CPC ............ G06F 3/061 (2013.01); G06F 3/0655 (2013.01); G06F 3/0673 (2013.01)

(58) Field of Classification Search
CPC ....... G06F 3/061; G06F 3/0655; G06F 3/0673
USPC ......................................................... 711/154
See application file for complete search history.

(56) References Cited

U.S. PATENT DOCUMENTS

| | | |
|---|---|---|
| 6,745,385 B1 | 6/2004 | Lupu et al. |
| 6,760,684 B1 | 7/2004 | Yang et al. |
| 7,216,263 B2 * | 5/2007 | Takaoka ............... G06F 3/061 709/224 |
| 7,546,598 B2 | 6/2009 | Blumenthal et al. |
| 7,606,944 B2 | 10/2009 | Kalwitz et al. |
| 8,087,017 B1 | 12/2011 | Whaley et al. |
| 8,464,023 B2 | 6/2013 | Devendran et al. |
| 9,047,018 B1 | 6/2015 | Ananthabhotla |
| 9,092,146 B2 | 7/2015 | Jayaraman et al. |

(Continued)

OTHER PUBLICATIONS

Optimizing AIX 7 performance: Part 1, Disk I/O overview and long-term monitoring tools (sar, nmon, and topas), Oct. 12, 2010, <https://www.IBM.com/developerworks/aix/library/au-aix7optimize1/>.

*Primary Examiner* — Christopher B Shin
(74) *Attorney, Agent, or Firm* — Knobbe, Martens, Olson & Bear, LLP

(57) ABSTRACT

Example systems relate to system call acceleration. A system may include a processor and a non-transitory computer readable medium. The non-transitory computer readable medium may include instructions to cause the processor to run a plurality of benchmarks for a hardware configuration. The non-transitory computer readable medium may further include instructions to determine a benchmark matrix based on the plurality of benchmarks. The non-transitory computer readable medium may include instructions to determine an input/output (I/O) bandwidth ceiling for the hardware configuration based on the benchmark matrix. Additionally, the non-transitory computer readable medium may include instructions to determine a performance threshold of an I/O access parameter for the hardware configuration based on the bandwidth ceiling.

15 Claims, 4 Drawing Sheets

(56) References Cited

U.S. PATENT DOCUMENTS

| | | |
|---|---|---|
| 9,135,265 B2 | 9/2015 | Drepper |
| 9,634,340 B2 | 4/2017 | Martinchek et al. |
| 2007/0288940 A1 | 12/2007 | Keljo |
| 2010/0318992 A1 | 12/2010 | Kushwaha et al. |
| 2011/0307890 A1 | 12/2011 | Achilles et al. |
| 2012/0197626 A1 | 8/2012 | Kejariwal et al. |
| 2013/0166886 A1 | 6/2013 | Sasanka et al. |
| 2014/0096132 A1 | 4/2014 | Wang et al. |
| 2014/0280984 A1 | 9/2014 | Raymond et al. |
| 2015/0039716 A1 | 2/2015 | Przykucki et al. |
| 2016/0062841 A1 | 3/2016 | Hu et al. |
| 2016/0117105 A1* | 4/2016 | Thangaraj ............ G06F 3/0604 711/103 |
| 2016/0373772 A1 | 12/2016 | Ellis et al. |
| 2016/0378545 A1 | 12/2016 | Ho |
| 2017/0147056 A1* | 5/2017 | Woo .................... G06F 1/324 |
| 2017/0236322 A1 | 8/2017 | Catalano et al. |
| 2017/0243028 A1 | 8/2017 | Lafever et al. |
| 2018/0007178 A1 | 1/2018 | Subhraveti |
| 2018/0039555 A1* | 2/2018 | Salunke ............ G06F 11/3034 |
| 2018/0314615 A1* | 11/2018 | Gay .................. G06F 11/3409 |
| 2019/0059104 A1* | 2/2019 | Gu .................... H04B 17/104 |

* cited by examiner

PERFORMANCE THRESHOLD

PRIORITY INFORMATION

This application is a divisional of U.S. National Stage application Ser. No. 16/482,980 filed on Aug. 1, 2019, which claims priority to International Application No. PCT/US2017/015987 filed on Feb. 1, 2017. The contents of which are incorporated herein by reference in its entirety.

BACKGROUND

Computer applications may read and/or write to files on a computer system. A read operation may allow a file to be accessed, or read from, while a write operation may allow a file to be altered, or written to. However, many applications use storage access patterns that cause the read and/or write operations to take longer periods of time. In some examples, the time it takes an operation to execute hinders the ability of a user to continue using the application.

DETAILED DESCRIPTION

Figure 1:
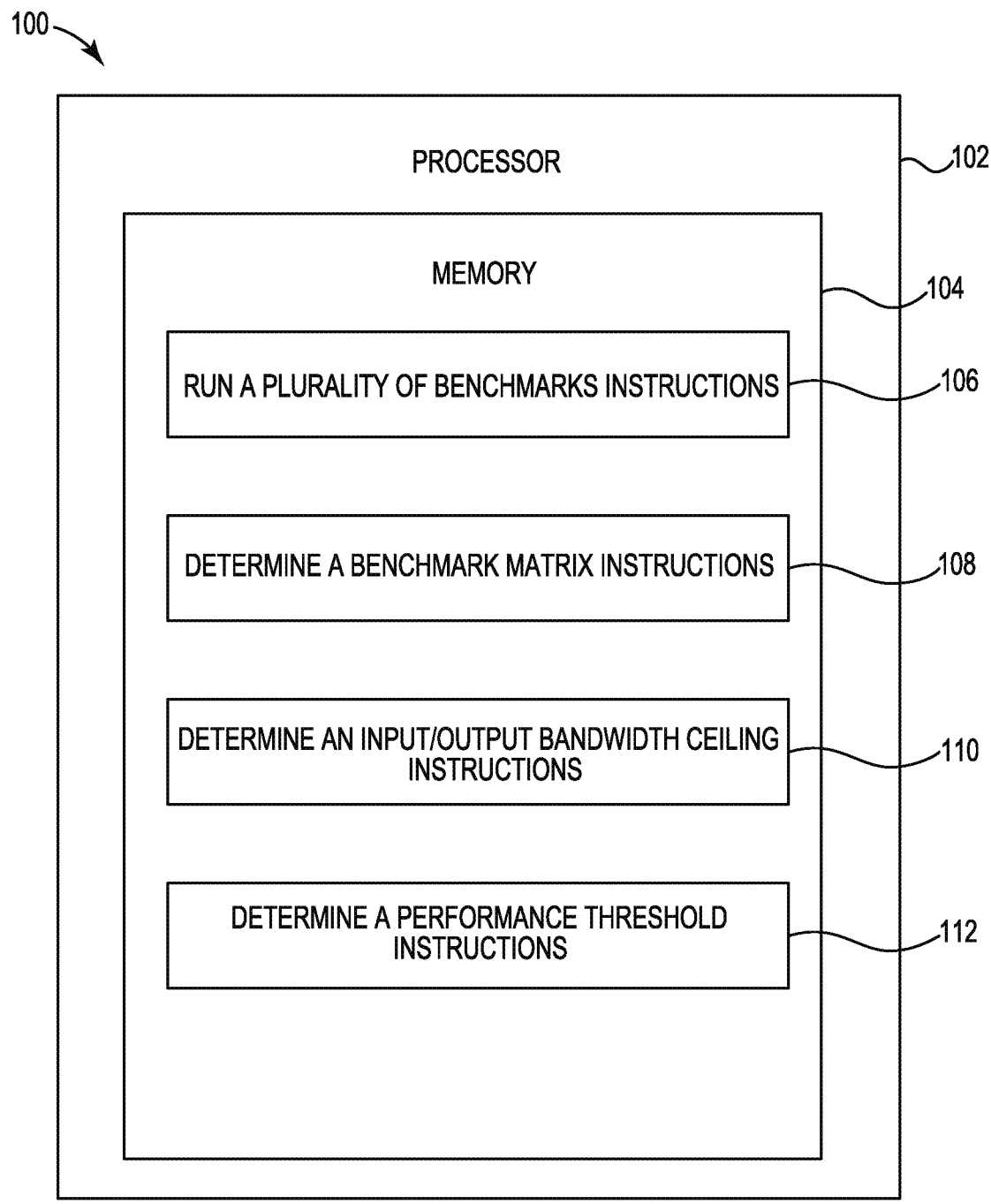
FIG. 1 is an example system for a performance threshold according to the present disclosure.

Computer applications may read and/or write to files, either directly or indirectly. When a computer application reads and/or writes to a file directly, there may be no cache memory between a processor and storage hardware, while when a computer application reads and/or writes to a file indirectly, a cache memory may be used. In some examples, the file may be located on storage hardware located on a computer system. As used herein, storage hardware may refer to any electronic, magnetic, optical, or other physical storage device that stores files and/or executable instructions. Once the file has been located, the application can perform a read and/or write operation on the file. Many applications use storage access patterns for particular storage hardware configurations. In some examples, applications use a storage access pattern or pattern of storage access that does not allow the file to be accessed in a timely fashion compared to other storage access patterns for the particular storage hardware configuration. In some instances, the storage access patterns are hard-coded into an application. Thus, the application will utilize the hard-coded storage access pattern to access the file even if a different storage access pattern would yield faster access to the file.

Because many applications include hard-coded storage access patterns, it may be difficult or impossible to change the access patterns. In some examples, changing a hard-coded storage access pattern for a single application may involve recompiling the entire application. Once the application has been recompiled, the application will be redeployed. For multiple applications, this process of recompilation and redeployment can be time-consuming.

An application may also experience delays in file retrieval and read/write operations due to the setup of the file access request. A request to access a file may include multiple attributes and parameters, such as read, write, synchronous, or asynchronous. In addition, the file access request can request a file with a particular size or overhead associated with the file. For example, the file access request can be a read operation of a file that is 8 Mb. In this example, the file access request can have a bandwidth ceiling of 3 Gigabytes per second (GB/s) for a particular storage solution associated with the file. In this example, the size of the file and the bandwidth ceiling can be utilized to break down the file into a plurality of threads such that the bandwidth ceiling is increased to a threshold bandwidth ceiling based on the software configuration and/or hardware configuration. However, when the file is broken down into a plurality of threads, overhead in the form of additional processing time and/or resources may be introduced. In some examples, the additional processing time may include an amount of time to reassemble the plurality of threads into a single file once the plurality of threads have been transmitted. In some examples, the increase in bandwidth ceiling to a threshold bandwidth ceiling through the breaking down of the request into a plurality of threads may result in the ability to process the request more quickly than the request would be processed had it not been broken down. Said differently, the increase in bandwidth ceiling and processing speed may outweigh the additional overhead. In some examples, the overhead introduced may not outweigh the increase in processing ability due to breaking a request apart into a plurality of threads. Thus, in some examples, there can be a trade-off between the overhead and the quantity of threads utilized to perform the file access request.

However, the attributes of a request sent by an application may result in the file system performing additional work to decode and execute the request. For example, a file system may be able to access a file that was requested using an asynchronous request more quickly than a file that was requested using a synchronous request. However, changing the attributes of a file access request made by an application may involve refactoring, recompiling, and redeploying the application. Refactoring, recompiling, and redeploying the application can be time-consuming and may not be possible on all applications.

Performance threshold, according to the present disclosure, allows for acceleration of system calls made by applications without the need to reconfigure and redeploy individual applications. Storage access parameters for a particular hardware configuration and/or a particular software configuration may be determined by running a set of benchmarks. The benchmark results may then be compiled into a matrix and analyzed to determine a threshold performance a particular hardware and/or software configuration.

In some examples, the matrix can be analyzed to determine a performance percentage for a system call if an additional quantity of threads were utilized. In these examples, the performance percentage can be a percent increase in performance or percent decrease in performance for each additional thread utilized for the system call. In some examples, the performance percentage can be utilized to determine the threshold performance of a particular hardware and/or software configuration. For example, a quantity of threads can be increased for the system call when the performance percentage is greater than a threshold performance percentage.

A system call executed by an application can be intercepted at a shim library. The shim library can analyze the system call to determine a type of the system call. In some examples, the shim library can analyze the system call to determine if the system call can be accelerated. The system call may be altered and run through the system in its altered state based on the analysis of the shim library. In some examples, alterations to the system call may be based on threshold performance determined by the benchmarks for the particular hardware and/or software configuration.

By intercepting the system call at a shim library, system call acceleration according to the present disclosure can eliminate reconfiguring and redeploying individual applications in order to achieve faster system call response. Performance threshold according to the present disclosure can allow the shim library to receive a system call from an application and alter the system call to correspond to the particular hardware and/or software configuration. For example, a performance threshold according to the present disclosure can allow a single system to accelerate system calls regardless of source or destination.

FIG. 1 is an example system 100 for a performance threshold according to the present disclosure. As shown in FIG. 1, system 100 may include a processor 102. System 100 may further include a memory 104 on which may be stored instructions, such as instructions 106, 108, 110, and 112. Although the following descriptions refer to a single processor and a single memory, the descriptions may also apply to a system with multiple processors and multiple memories. In such examples, the instructions may be distributed (e.g., stored) across multiple memories and the instructions may be distributed (e.g., executed by) across multiple processors.

Processor 102 may be a central processing unit (CPU), a semiconductor based microprocessor, and/or other hardware devices suitable for retrieval and execution of instructions stored in memory 104. Processor 102 may fetch, decode, and execute instructions 106, 108, 110, 112, or a combination thereof. As an alternative or in addition to retrieving and executing instructions, processor 102 may include at least one electronic circuit that includes electronic components for performing the functionality of instructions 106, 108, 110, 112, or a combination thereof.

Non-transitory computer readable storage medium 104 may be any electronic, magnetic, optical, or other physical storage device that stores executable instructions. Thus, non-transitory computer readable storage medium 104 may be, for example, Random Access Memory (RAM), an Electrically-Erasable Programmable Read-Only Memory (EEPROM), a storage drive, an optical disc, and the like. Non-transitory computer readable storage medium 104 may be disposed within system 100, as shown in FIG. 1. In this example, the executable instructions may be "installed" on the system 100. Additionally and/or alternatively, non-transitory computer readable storage medium 104 may be a portable, external or remote storage medium, for example, that allows system 100 to download the instructions from the portable/external/remote storage medium. In this situation, the executable instructions may be part of an "installation package". As described herein, non-transitory computer readable storage medium 104 may be encoded with executable instructions for a performance threshold.

In some examples, the system 100 may include instructions 106 to run a plurality of benchmarks for a hardware configuration that can be executed by a processor such as processor 102. As used herein, a benchmark refers to a standard or reference point against which attributes may be measured. In some examples, a benchmark may be used to evaluate the performance of a system, such as system 100. Examples of benchmarks may include a number of reads, or how many times a file has been accessed, and a number of writes, or how many times a file has been altered. Other examples of benchmarks may include a whether a file has page cache on or off, an amount of offset randomness, or an alignment offset corresponding to a storage size of a hardware configuration. Still other examples of benchmarks may include a number of synchronous requests, or how many times a request that blocks the client until operation is complete has been made, and a number of asynchronous requests, or how many times a request that does not block the client until operation is complete has been made. Further examples of benchmarks may include a record size, and/or an amount of parallelism, both discussed further herein. In some examples, instructions 106 may be executed for a plurality of hardware configurations. Each hardware configuration may have a corresponding plurality of benchmarks run independently, allowing for benchmarks to be determined for each of the plurality of hardware configurations. In some examples, instructions 106 may be executed for a plurality of software configurations, with each software configuration having a corresponding plurality of benchmarks run independently.

System 100 may include instructions 108 that can be executed by a processor such as processor 102 to determine a benchmark matrix based on the plurality of benchmarks. As used herein, a benchmark matrix refers to an array of values that define attributes of a system, such as system 100. The array of values may be represented in matrix format, in comma-separated values (CSV) format, in JavaScript Object Notation (JSON) format, or in another format suitable for representing and defining attributes of a system. A benchmark matrix may contain values corresponding to a plurality of the benchmark results determined by instructions 106. In some examples, a plurality of benchmark matrices may be constructed. In such examples, each benchmark matrix may correspond to a particular hardware configuration, a particular software configuration, and/or a particular combination of hardware configuration and a software configuration.

Instructions 110 may include instructions, to determine an input/output (I/O) bandwidth ceiling for the hardware configuration when executed by a processor such as processor 102. As used herein, a bandwidth ceiling refers to a threshold performance ability of a particular hardware configuration. In some examples, instructions 110 may further cause processor 102 to determine a bandwidth ceiling for a particular software configuration. In such examples, the bandwidth ceiling may correspond to a threshold performance ability of the particular software configuration. In some examples, instructions 110 may cause processor 102 to determine a bandwidth ceiling for a particular combination of hardware and software. In such examples, the bandwidth ceiling may correspond to a threshold performance ability of the particular hardware and software combination.

Instructions 112 may include instructions that, when executed by a processor such as processor 102, cause the processor to determine a performance threshold of an I/O access parameter for the hardware configuration based on the bandwidth ceiling. As used herein, a performance threshold refers to a performance ability of a system, such as system 100. In some examples, the performance ability of a system may correspond to the speed with which the system is able to process a request. The performance ability of a system may include variations based on a particular I/O access parameter. For example, a first I/O parameter, such as a synchronous parameter, may correspond to a first performance ability of the system, while a second I/O parameter, such as an asynchronous parameter, may correspond to a second performance ability of the system. Instructions 112 may utilize the bandwidth ceiling determined by instructions 110 to determine the performance threshold. In some examples, instructions 112 may cause the processor to determine a performance threshold for a particular software configuration. In some examples, instructions 112 may cause the processor to determine a performance threshold for a particular combination of hardware and software. In such examples, the performance threshold may correspond to the performance ability of the combination of hardware and software.

In some examples, instructions 112 may include instructions to determine an amount of parallelism for a system call on the hardware configuration. As used herein, parallelism refers to running a particular command or program using multiple threads, with the multiple threads running simultaneously. As used herein, a system call refers to a request to read and/or write operations using access configurations. As used herein, an access configuration refers to the parameters and attributes of the system call. A system call may be invoked by an application running on a system, such as system 100, to access a file and perform a read and/or write operation. In some examples, the access configuration of a system call may correspond to the particular application. Said differently, a system call may have a particular set of attributes and parameters based on its originating application.

In some examples, the amount of parallelism may be determined by the bandwidth ceiling determined by instructions 110 and performance threshold determined by instructions 112. In some examples, a system may have a particular bandwidth ceiling and a particular performance threshold. Instructions 112 may determine, based on the particular bandwidth ceiling and the particular performance threshold, that breaking a system call into a plurality of threads to run in parallel may increase the particular bandwidth ceiling and/or increase the particular performance threshold of the system. For example, a bandwidth ceiling of 3.5 Gigabits per second (GB/s) for a single 65 megabyte (MB) thread may be determined by instructions 110. Instructions 112 may determine that using sixteen parallel threads, each running 128 kilobytes of information, instead of the single thread, will increase the bandwidth ceiling to 30 GB/s. Examples are not so limited, however, and any amount of parallelism may be determined.

In some examples, instructions 112 may include instructions to determine a record size configuration for a system call running on the hardware configuration. As used herein, a record size refers to an amount of data to be processed. In some examples, a record size may correspond to the size of the system call. In some examples, instructions 112 may include instructions to determine a record size that is less than the size of the system call. In such examples, the determined record size configurations may be based on an amount of parallelism. In some examples, a single thread of a first size may be broken into a plurality of threads of a second size, wherein the second size is smaller than the first size. For example, a single 65 MB thread may be broken up into sixteen parallel threads. In such an example, instructions 112 may determine that the system call to be run in parallel should be broken into sixteen threads of equal record size, with each thread having a size of 128 KB. Examples are not so limited, however, and any record size may be determined. By determining the attributes and limitations of a particular hardware and/or software configuration, system 100 may allow applications to run a system call so as to utilize the hardware and/or software to its fullest potential. Said differently, determining the attributes and limitations of a particular hardware and/or software configuration may allow system 100 to tailor system calls made by applications to the particular limitations and attributes.

Figure 2:
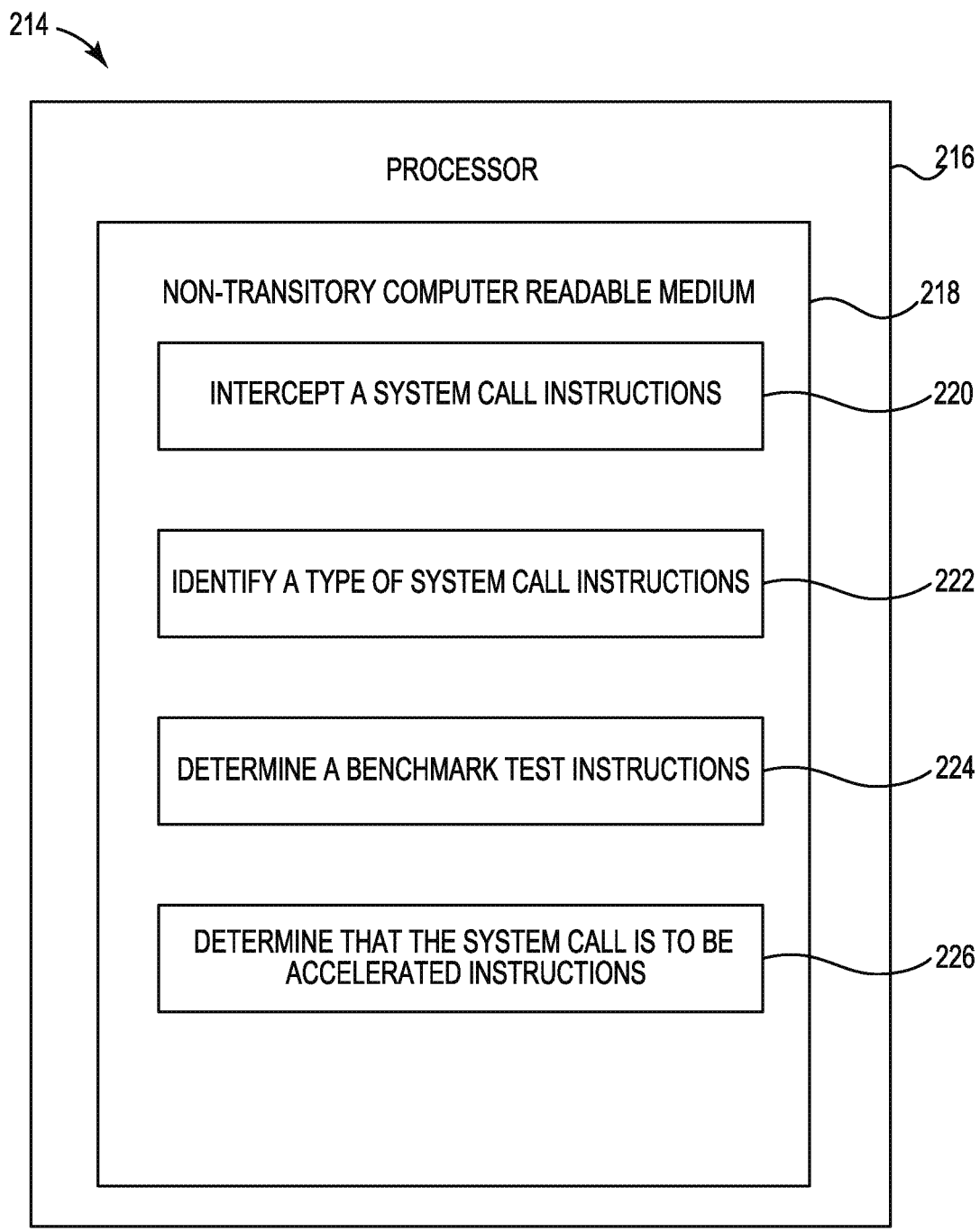
FIG. 2 is an example system for a performance threshold according to the present disclosure.

FIG. 2 is an example system 214 for a performance threshold according to the present disclosure. System 214 may include a processor 216 and a non-transitory computer readable medium 218, on which may be stored instructions such as instructions 220, 222, 224, and/or 226. Although the following descriptions refer to a single processor and a single non-transitory computer readable medium, the descriptions may also apply to a system with multiple processors and multiple non-transitory computer readable media. In such examples, the instructions may be distributed (e.g., stored) across multiple non-transitory computer readable media and the instructions may be distributed (e.g., executed by) across multiple processors. Non-transitory computer readable medium 218 may be the same as or similar to non-transitory computer readable medium 104, discussed previously with respect to FIG. 1.

Instructions 220 may include instructions that, when executed by a processor such as processor 216, may cause the processor to intercept a system call. As described herein, a system call may be used by an application running on a system, such as system 214, to access storage. The system call may request read and/or write operations, and may do so using a plurality of hardware and software access configurations.

In some examples, instructions 220 may include instructions to intercept the system call at a shim library. As used herein a shim library refers to a library to intercept application programming interface (API) calls. An API call may be akin to a system call, described previously with reference to FIG. 1. In some examples, a shim library may be used to change an argument to be passed. In other examples, a shim library may be used to redirect an operation or may handle the operation itself.

In some examples, instructions 220 may include instructions to intercept a system call prior to the system call reaching the operating system or file system for which it was originally intended. Said differently, instructions 220 may include instructions to intercept the system call at the shim library before the system call reaches its destination. In some examples, the shim library may include instructions to automatically intercept all system calls, such that each system call will pass through the shim library. Furthermore, the shim library may include instructions to replace the operating system or file system. In such examples, an application that would execute a system call using an operating system or a file system may execute the system call using the shim library.

Instructions 222 may include instructions to identify a type of system call that may be executed by a processor such as processor 216. In some examples, the processor may determine a type of system call, such as an open call, a read call, a write call, an asynchronous call, and/or a synchronous call. Said differently, instructions 222 may cause the processor to determine the variety of system call. Furthermore, instructions 222 may include instructions to cause the processor to identify parameters of a system call. For example, instructions 222 may include instructions to identify the record size of the system call. As described with reference to FIG. 1, a record size refers to an amount of data contained within a system call. The processor may further identify additional parameters of the system call, such as whether the system call has page cache on or has page cache off. Examples are not so limited, however, and any type of system call parameter may be identified.

Instructions 224 may include instructions executable by a processor such as processor 216 to determine a benchmark test corresponding to the identified type of system call and to a plurality of parameters of the system call. As used herein, a benchmark test refers to a test based on benchmarks, such as the benchmarks discussed with respect to FIG. 1. In some examples, the benchmark test may correspond to the benchmark matrix computed by instructions 108 in FIG. 1. Said differently, a benchmark test may include the plurality of benchmarks run for a particular hardware and/or software configuration of a system, such as system 214. In some examples, the benchmark test determined by instructions 224 may correspond to the type of system call identified by instructions 222. Additionally, the benchmark test determined by instructions 224 may correspond to a plurality of system call parameters determined by instructions 222.

In some examples, instructions 224 may include instructions to determine that a particular benchmark test includes a threshold number of benchmarks that match the system call identified by instructions 222. For example, a system call may be identified as a read operation with a size of 100 MB and having page cache on. Instructions 224 may include instructions to select a benchmark test that corresponds to at least two of the three attributes of the system call. Furthermore, instructions 224 may include instructions to determine that a match to particular characteristic of the system call should be prioritized. For example, instructions 224 may include instructions to search for and select the benchmark test that matches the type of system call. In such examples, other parameters may be de-prioritized. Examples, however, are not so limited, and any threshold and/or prioritization may be used to determine a benchmark test.

Instructions 226, may include instructions executable by a processor such as processor 216 to cause the processor to determine that the system call is to be accelerated based on the corresponding benchmark test. As used herein, accelerating a system call refers to changing the processing of a system call in such a way that the system call is able to be processed at a higher rate than it would be had the processing not been changed. In some examples, instructions 226 may include instructions to determine that the system call is to be accelerated based on the benchmark test determined by instructions 224. Acceleration of the system call is further discussed herein with respect to FIG. 3.

Figure 3:
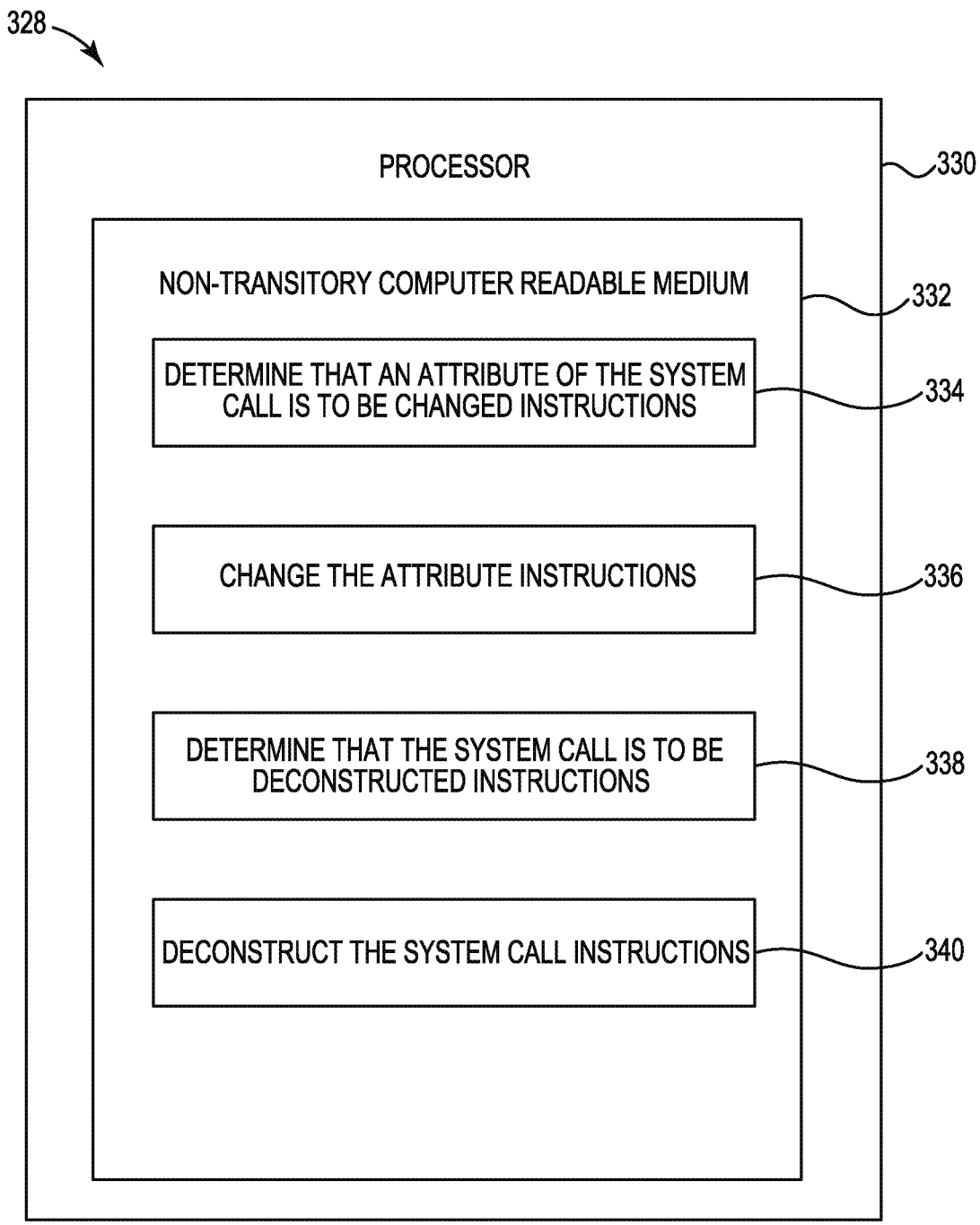
FIG. 3 is an example system for a performance threshold according to the present disclosure.

FIG. 3 is an example system 328 for a performance threshold according to the present disclosure. As shown in FIG. 3, system 328 may include a processor 330 and a non-transitory computer-readable medium 332. Processor 330 may be the same as or similar to processor 102, discussed with respect to FIG. 1, or processor 216, discussed with respect to FIG. 2. Non-transitory computer readable medium 332 may be the same as or similar to non-transitory computer readable medium 104 or non-transitory computer readable medium 218, discussed with respect to FIGS. 1 and 2, respectively. As described herein, non-transitory computer readable medium 332 may be encoded with executable instructions for a performance threshold.

Instructions 334, when executed by a processor such as processor 330, may cause the processor to determine that a system call is to be accelerated through alteration of an attribute of the system call based on the benchmark test. In some examples, instructions 334 may cause the processor to determine that a system call is to be accelerated through alteration of an attribute in response to the determination that the system call is to be accelerated, as discussed with respect to FIG. 2. Said differently, when a system call is determined to be accelerated by instructions 226 (shown in FIG. 2), a determination may be made that the acceleration is to occur by changing an attribute of the system call. For example, a determination may be made that changing a single attribute of the system call may result in acceleration of the system call. However, examples are not so limited, and any number of attributes of the system call may be determined to be changed. In some examples, the determination of the particular attribute or attributes to be changed may be based on the benchmark test determined by instructions 224, discussed with respect to FIG. 2.

Instructions 336 may cause changing of the attribute of the system call by a processor, such as processor 330. In some examples, instructions 336 may cause the processor to change the attribute determined to be changed by instructions 334. For example, a determination may be made that a synchronous system call is to be changed to an asynchronous system call by instructions 334. Instructions 336 may then cause the "synchronous" attribute to be changed to "asynchronous". Examples are not so limited, however, and any attribute may be changed by instructions 336. Furthermore, although the example includes changing a single attribute, any number of attributes of the system call may be changed by instructions 336.

Instructions 338 may be executable by a processor, such as processor 330, to cause the processor to determine, based on the benchmark test, that the system call is to be deconstructed into a plurality of parallel threads. As described with respect to FIG. 1, the plurality of threads may be determined based on an amount of parallelism determined by a performance threshold. In some examples, the plurality of threads may be determined based on the benchmark test determined to correlate to the particular system call by instructions 224, discussed with respect to FIG. 2. Instructions 338 may include instructions to deconstruct the system call into the plurality of parallel threads.

Instructions 340, when executed by a processor such as processor 330, may cause the processor to deconstruct the system call into the plurality of parallel threads. In some examples, instructions 340 may cause the processor to deconstruct the system call into the plurality of threads in response to instructions 338 making the determination that the system call is to be deconstructed. As discussed previously with respect to FIG. 1, the deconstruction of the system call by instructions 340 may be based on an amount of parallelism determined for the particular system, such as system 326. In some examples, instructions 340 may cause the processor to break the system call into a plurality of threads, wherein the particular number of threads was determined by instructions 338. For example, a determination may be made by instructions 338 that the system call is to be deconstructed into sixteen parallel threads. Instructions 340 may then cause the system call to be deconstructed into the sixteen parallel threads. In some examples, deconstructing the system call by instructions 340 may include changing the record size of the call. As described with respect to FIG. 1, when a system call is broken into parallel threads, the overall record size of the system call may be distributed over the parallel threads. Thus, for example, a system call with a record size of 65 MB for a single thread may use a record size of 128 KB when broken into sixteen parallel threads, with each of the sixteen threads running 128 KB of the system call.

System 328 may further include instructions, executable by a processor such as processor 330, to run a system call in deconstructed form. In some examples, each of the threads of the system call may be run simultaneously. Said differently, a system call that has been deconstructed into parallel threads may run the threads in parallel, allowing the system call to be transmitted as an overall unit.

System 328 may further include instructions, executable by a processor such as processor 330, to reconstruct the system call once the system call has run. In some examples, reconstructing the system call may include combining parallel threads. For example, a system call that was deconstructed into sixteen separate parallel threads by instructions 340 and run through in such deconstructed form may have the sixteen threads recombined into a single thread, representing the system call. In other words, by recombining the parallel threads into a single thread, system 328 may restore the system call to its original form.

Reconstructing the system call may further include restoring an attribute of the system call changed by instructions 336. As described previously, an attribute of the system call may be changed in response to a determination that the system call is to be accelerated. Reconstructing the system call, thus, may include returning the changed attribute to the original attribute. For example, an asynchronous system call may have been changed by instructions 336 to a synchronous system call. The instructions to reconstruct the system call would then include instructions to change the synchronous system call back to an asynchronous system call. Said differently, reconstructing the system call may include returning any changed attributes of a system call back to the original attributes, thus restoring the system call to its original form, reconstructed into a single threads and with the original attributes.

Figure 4:
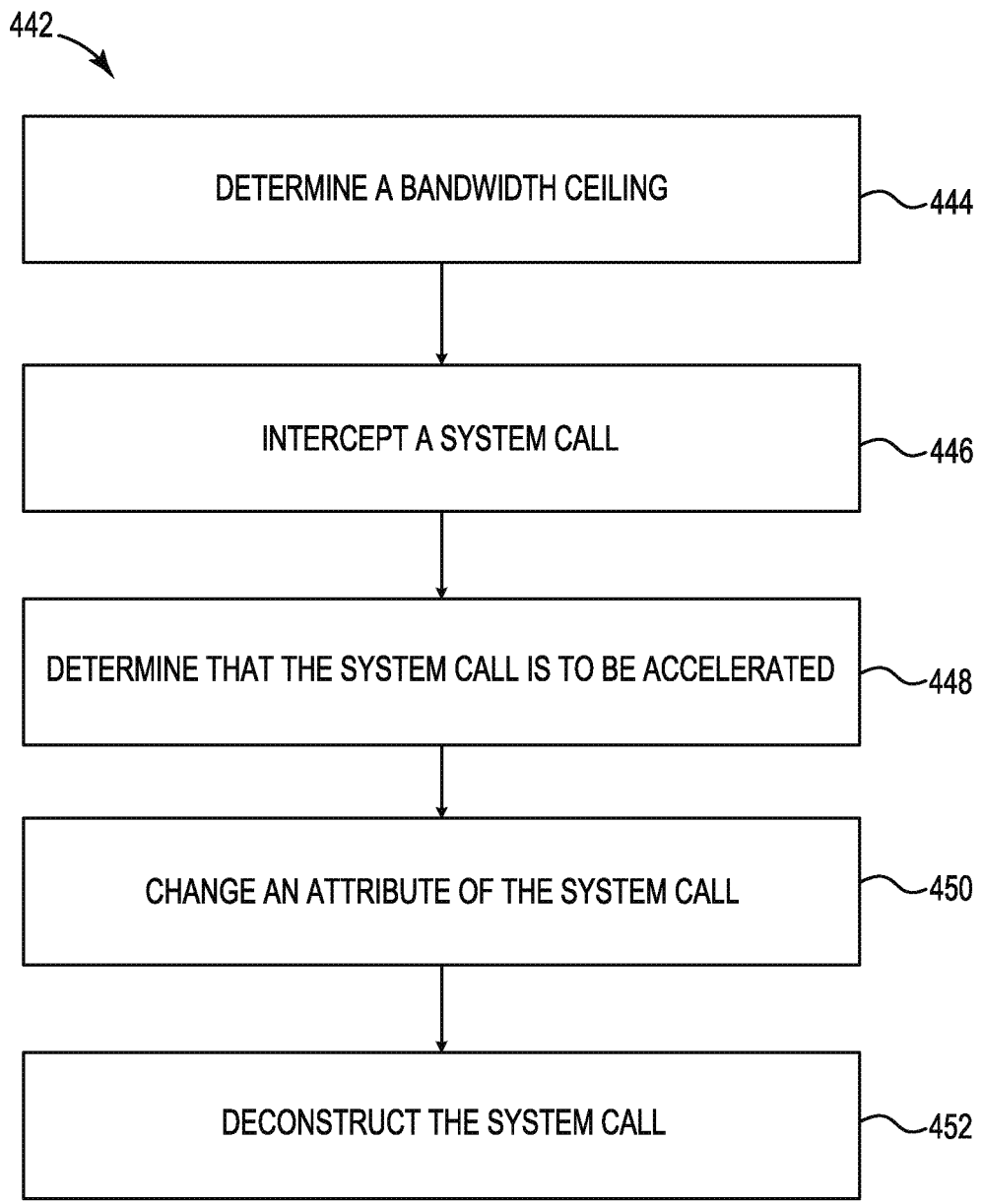
FIG. 4 is an example method for a performance threshold according to the present disclosure.

FIG. 4 shows a method 442 for a performance threshold according to the present disclosure. At 444, method 442 includes determining a bandwidth ceiling. As discussed previously with respect to FIG. 1, the bandwidth ceiling may refer to a threshold performance ability of a particular hardware configuration, a particular software configuration, or a particular configuration of hardware and software. As described with respect to FIG. 1, a bandwidth ceiling may be determined based on a plurality of benchmarks corresponding to attributes of the hardware configuration, software configuration, and/or combination of a hardware configuration and software configuration.

At 446, method 442 includes intercepting a system call. In some examples, the system call may be intercepted at a shim library. As discussed previously with respect to FIG. 2, the system call may be intercepted prior to reaching its final destination. In some examples, intercepting the system call at 446 may include bypassing the system call's definition entirely. In such examples, processing of the system call may occur at the shim library.

At 448, method 442 includes determining that the system call is to be accelerated. In some examples, the determination that the system call is to be accelerated may be based on the bandwidth ceiling determined at 444. Determining that the system call is to be accelerated at 448 may be similar to instructions 226, discussed previously with respect to FIG. 2.

At 450, method 442 may include changing an attribute of the system call. In some examples, changing the attribute of the system call at 450 may be based on the bandwidth ceiling determined at 444. In some examples, changing the attribute of the system call may be based on the determination that the system call is to be accelerated made at 448. As described previously with respect to FIG. 3, changing an attribute of the system call may include identifying a particular attribute to be changed. Changing an attribute of a system call at 450 may be similar to instructions 336, discussed previously with respect to FIG. 3.

At 452, method 442 may include deconstructing the system call. In some examples, the system call may be deconstructed at 452 based on the bandwidth ceiling determined at 444. In some examples, the system call may be deconstructed at 452 based on the determination that the system call is to be accelerated made at 448. In some examples, the deconstruction of the system call may occur at the shim library. Said differently, the system call may be deconstructed after it has been intercepted by the shim library. Deconstructing a system call at 452 may be similar to instructions 340, discussed with respect to FIG. 3.

In some examples, deconstructing a system call at 452 may include determining a number of threads to use for the system call. As described with respect to FIG. 3, the number of threads may be determined based on an amount of parallelism identified for a particular configuration of hardware and/or software. In some examples, the number of threads may be determined based on the bandwidth ceiling determined at 444. As discussed with respect to FIG. 1, the bandwidth ceiling may indicate an amount of parallelism, and thus a number of threads, for the particular hardware and software configuration. Once a number of threads has been determined, the system call may be deconstructed at 452 by breaking the system call into the identified number of threads.

In some examples, method 442 may include identifying a type of system call. As discussed with respect to FIG. 2, identifying a type of system call may include identifying attributes of the system call. Identifying a type of system call may further include identifying parameters of the system call. Identifying a type of system call in method 442 may correspond to instructions 222, discussed previously with respect to FIG. 2. In some examples, method 442 may further include deconstructing the system call based on the identification. Said differently, a system call may be deconstructed based on its identified attributes and parameters.

In the foregoing detail description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that structural changes may be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense. Further, as used herein, "a number of" an element and/or feature can refer to any number of such elements and/or features.

What is claimed:

1. A computing device, comprising:
a processor; and
a non-transitory computer readable medium storing instructions to cause the processor to:
run a plurality of benchmarks for a hardware configuration;
determine a benchmark matrix based on the plurality of benchmarks;
determine an input/output (I/O) bandwidth ceiling for the hardware configuration based on the benchmark matrix;
determine a performance threshold of an I/O access parameter for the hardware configuration based on the bandwidth ceiling;
intercept a system call at a shim library to analyze a type of the system call; and
alter the system call based on the performance threshold and the type of system call, wherein altering the system call includes altering a quantity of threads for the system call.

2. The computing device of claim 1, wherein the instructions to determine a bandwidth ceiling includes instructions to determine a bandwidth ceiling for a corresponding software configuration of the hardware configuration.

3. The computing device of claim 1, wherein the bandwidth ceiling corresponds to a threshold performance ability of a particular combination of hardware and software.

4. The computing device of claim 1, comprising instructions to:
determine an amount of parallelism for a system call on the hardware configuration; and
determine a record size configuration for a system call on the hardware configuration.

5. The computing device of claim 1, wherein the plurality of benchmarks includes:
a number of reads;
a number of writes;
a page cache on;
a page cache off;
an amount of offset randomness;
an alignment offset, wherein the alignment offset corresponds to a storage size of the hardware configuration;
a number of synchronous requests;
a number of asynchronous requests;
a record size; and
an amount of parallelism.

6. A non-transitory memory resource storing machine-readable instructions stored thereon that, when executed, cause a processor of a computing device to:
determine storage access parameters for a particular hardware configuration and a particular software configuration by running a plurality of benchmarks;
determine a benchmark matrix based on the plurality of benchmarks;
determine a threshold performance for the particular hardware configuration and the particular software configuration based on the benchmark matrix;
intercept system calls at a shim library to analyze a type of the system calls; and
alter the system calls of the particular hardware configuration and the particular software configuration based on the threshold performance and the type of system calls, wherein altering the system calls includes altering a quantity of threads for the system calls.

7. The memory resource of claim 6, wherein the processor is to increase the quantity of threads for systems calls when the threshold performance is greater than a threshold value.

8. The memory resource of claim 6, wherein the processor is to decrease the quantity of threads for systems calls when the threshold performance is less than a threshold value.

9. The memory resource of claim 6, wherein the plurality of benchmarks correspond to a plurality of benchmarks run on a plurality of different hardware configurations include the particular hardware configuration and a plurality of software configurations including the particular software configuration.

10. The memory resource of claim 6, wherein the benchmark matrix includes an array of values that represent attributes of a system based on results of the plurality of the benchmark.

11. The memory resource of claim 6, wherein the processor is to determine a benchmark matrix for the particular hardware configuration, the particular software configuration, and a combination of the particular hardware configuration and the particular software configuration.

12. A system, comprising:
a processor; and
a non-transitory computer readable medium storing instructions to cause the processor to:
run a plurality of benchmarks for a combination of a hardware configuration and a software configuration;
determine a benchmark matrix based on the plurality of benchmarks, wherein the benchmark matrix includes an array of values that represent a performance of the software configuration executing on the hardware configuration;
determine an input/output (I/O) bandwidth ceiling for the combination of the hardware configuration and the software configuration based on the benchmark matrix;
determine a performance threshold of an I/O access parameter for the combination of the hardware configuration and the software configuration based on the bandwidth ceiling;
intercept system calls at a shim library to analyze a type of the system calls; and
alter the system calls of the combination of the hardware configuration and the software configuration based on a comparison between the determined threshold performance and a threshold value and based on the type of system calls, wherein altering the system calls includes altering a quantity of threads for the system calls.

13. The system of claim 12, wherein the quantity of threads for system calls corresponds to an amount of parallelism for the system calls.

14. The system of claim 12, wherein the processor is to determine a portion of the plurality of benchmarks to be utilized to determine the benchmark matrix based on a determined type of the systems calls.

15. The system of claim 12, wherein the processor is to determine a portion of the plurality of benchmarks to be utilized to determine the benchmark matrix based on system call parameters of the system calls.

* * * * *